United States Patent
Che et al.

(10) Patent No.: US 12,395,724 B2
(45) Date of Patent: Aug. 19, 2025

(54) METHOD AND APPARATUS FOR CONTENT CAPTURING, DEVICE AND STORAGE MEDIUM

(71) Applicant: Beijing Zitiao Network Technology Co., Ltd., Beijing (CN)

(72) Inventors: Wanli Che, Beijing (CN); Lulu Wang, Beijing (CN); Zhenan Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/818,312

(22) Filed: Aug. 28, 2024

(65) Prior Publication Data
US 2024/0422425 A1    Dec. 19, 2024

Related U.S. Application Data

(63) Continuation of application No. PCT/CN2023/092315, filed on May 5, 2023.

(30) Foreign Application Priority Data

Jun. 28, 2022  (CN) .......................... 202210754280.X

(51) Int. Cl.
H04N 23/63 (2023.01)
H04N 23/61 (2023.01)

(52) U.S. Cl.
CPC ........... *H04N 23/632* (2023.01); *H04N 23/61* (2023.01)

(58) Field of Classification Search
CPC .............................. H04N 23/632; H04N 23/61
(Continued)

(56) References Cited

U.S. PATENT DOCUMENTS 8,910,082 B2 * 12/2014 Aarabi ................. G06F 3/0482
715/834
9,304,667 B2 * 4/2016 Petitt, Jr. ................. H04L 65/60
(Continued)

FOREIGN PATENT DOCUMENTS

CN    103971713 A    8/2014
CN    108668164 A    10/2018
(Continued)

OTHER PUBLICATIONS

Notification to Grant Patent Right for Invention for Chinese Patent Application No. 202210754280.X, mailed on Mar. 15, 2024, 7 pages.
(Continued)

*Primary Examiner* — Pritham D Prabhakher
(74) *Attorney, Agent, or Firm* — Astute IP Law Group

(57) ABSTRACT

Embodiments of the present disclosure provides a method and an apparatus for content capturing, a device and a storage medium. The method includes: in response to determining that a first capturing material of at least a first type is selected, presenting a plurality of material identifiers corresponding to a plurality of capturing materials of at least a second type, the plurality of capturing materials being associated with the first capturing material; determining a selected capturing material in the plurality of capturing materials based on a selection operation on a material identifier in the plurality of material identifiers; and in response to determining that a second capturing material in the plurality of capturing materials is selected, presenting a first capturing preview comprising the first capturing material and the second capturing material.

20 Claims, 8 Drawing Sheets

(58) Field of Classification Search
USPC .................................................. 348/333.11
See application file for complete search history.

(56) References Cited

U.S. PATENT DOCUMENTS

| | | | | |
|---|---|---|---|---|
| 9,516,259 | B2* | 12/2016 | Zheng | G16H 40/67 |
| 9,930,248 | B2* | 3/2018 | Bayani | H04N 23/62 |
| 10,157,455 | B2* | 12/2018 | Jeong | G06F 3/04842 |
| 10,528,243 | B2* | 1/2020 | Manzari | H04N 23/651 |
| 10,733,716 | B2* | 8/2020 | Jeong | G06T 3/40 |
| 10,866,716 | B2* | 12/2020 | Sinclair | G06F 3/04817 |
| 11,138,434 | B2* | 10/2021 | Lee | G06V 40/168 |
| 12,190,576 | B2* | 1/2025 | Lee | G06T 13/40 |
| 2010/0214442 | A1* | 8/2010 | Uemura | H04N 5/772 |
| | | | | 348/222.1 |
| 2012/0155848 | A1* | 6/2012 | Labowicz | H04N 5/2621 |
| | | | | 396/299 |
| 2012/0251081 | A1* | 10/2012 | Kawaguchi | G11B 27/34 |
| | | | | 386/278 |
| 2014/0112585 | A1* | 4/2014 | Kawanishi | G06T 11/60 |
| | | | | 382/217 |
| 2015/0019982 | A1* | 1/2015 | Petitt, Jr. | G06F 21/00 |
| | | | | 715/738 |
| 2015/0117839 | A1* | 4/2015 | Oberbrunner | H04N 21/237 |
| | | | | 386/280 |
| 2015/0177937 | A1* | 6/2015 | Poletto | G06F 3/167 |
| | | | | 715/739 |
| 2016/0035074 | A1* | 2/2016 | Jeong | G06T 11/60 |
| | | | | 382/282 |
| 2016/0291814 | A1* | 10/2016 | Pigat | G06F 3/0482 |
| 2018/0047200 | A1* | 2/2018 | O'Hara | G06V 10/242 |
| 2019/0139207 | A1* | 5/2019 | Jeong | G06T 5/70 |
| 2020/0265234 | A1* | 8/2020 | Lee | H04N 23/632 |
| 2021/0012761 | A1 | 1/2021 | Song | |
| 2021/0042830 | A1* | 2/2021 | Burke | G06Q 20/341 |
| 2022/0020396 | A1* | 1/2022 | Khan | G11B 27/3036 |
| 2022/0201203 | A1* | 6/2022 | Lim | H04N 23/667 |
| 2022/0264029 | A1* | 8/2022 | Qi | H04N 21/4402 |
| 2022/0382442 | A1 | 12/2022 | Liang et al. | |

FOREIGN PATENT DOCUMENTS

| | | |
|---|---|---|
| CN | 109068063 A | 12/2018 |
| CN | 110891191 A | 3/2020 |
| CN | 111835986 A | 10/2020 |
| CN | 111930994 A | 11/2020 |
| CN | 112165632 A | 1/2021 |
| CN | 112449231 A | 3/2021 |
| CN | 112492201 A | 3/2021 |
| CN | 112911379 A | 6/2021 |
| CN | 113473019 A | 10/2021 |
| CN | 113473204 A | 10/2021 |
| CN | 113778285 A | 12/2021 |
| CN | 111277761 B | 3/2022 |
| CN | 114390193 A | 4/2022 |
| CN | 114598815 A | 6/2022 |
| CN | 114640805 A | 6/2022 |
| CN | 114979495 A | 8/2022 |
| JP | 2010541415 A | 12/2010 |
| JP | 2021513699 A | 5/2021 |
| JP | 2021149732 A | 9/2021 |
| WO | 2020010814 A1 | 1/2020 |
| WO | 2021093737 A1 | 5/2021 |
| WO | 2022042776 A1 | 3/2022 |
| WO | 2022063090 A1 | 3/2022 |
| WO | 2022068698 A1 | 4/2022 |

OTHER PUBLICATIONS

Yin et al., "Design of Short Video APP Based on User Experience", Packaging engineering, vol. 41, No. 6, Mar. 20, 2020, 8 pages, with English Abstract.
Zhao Cui., "The meme theory logic and communication mechanism of social short video shooting the same style", Media Forum 07, vol. 3, No. 7, Apr. 10, 2020, 4 pages, with English Abstract.
International Search Report for PCT/CN2023/092315, mailed Sep. 5, 2023, 7 pages.
Kwai APP, 1 page.
Office Action for Chinese Patent Application No. 202210754280.X, mailed Sep. 13, 2023, 11 pages.
Office Action for Japanese Patent Application No. 2024-550667, mailed on Mar. 18, 2025, 10 pages.
Extended European Search Report for European Patent Application No. 23829699.0, mailed on Jun. 10, 2025, 11 pages.

* cited by examiner

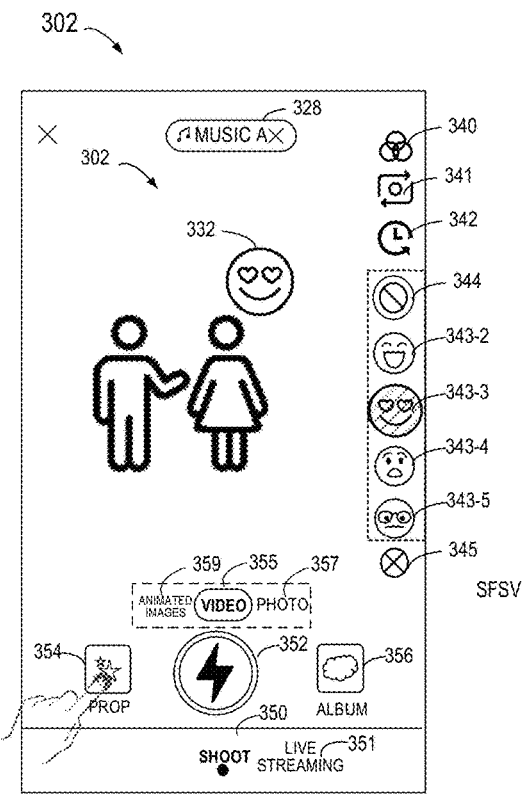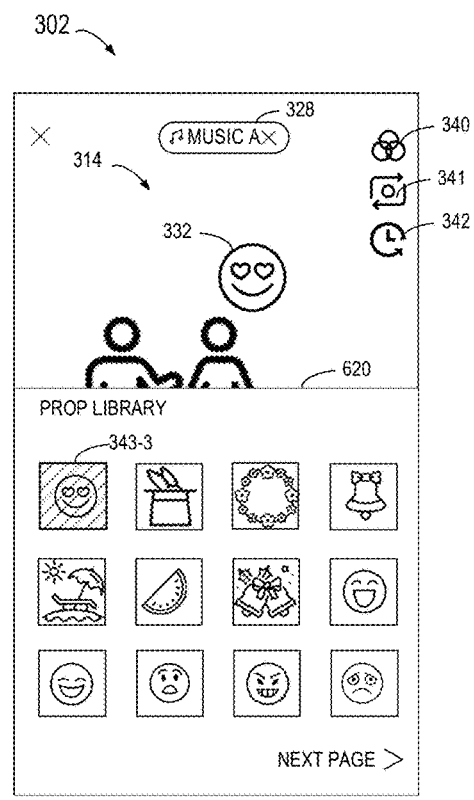
FIG. 6A
FIG. 6B
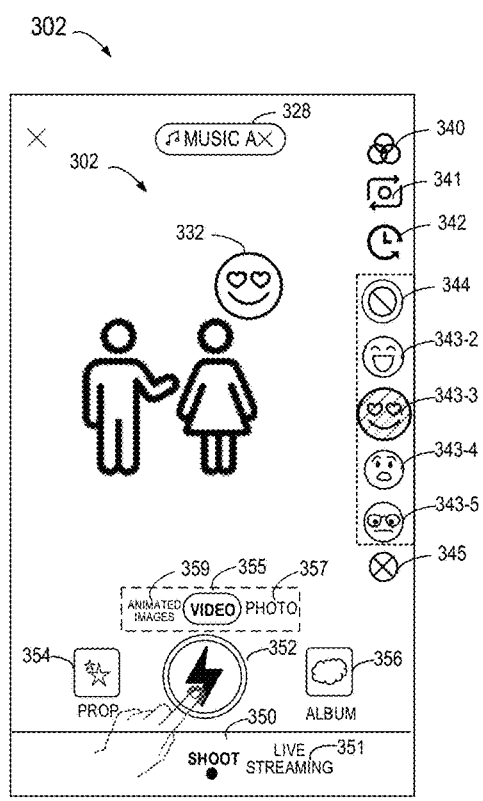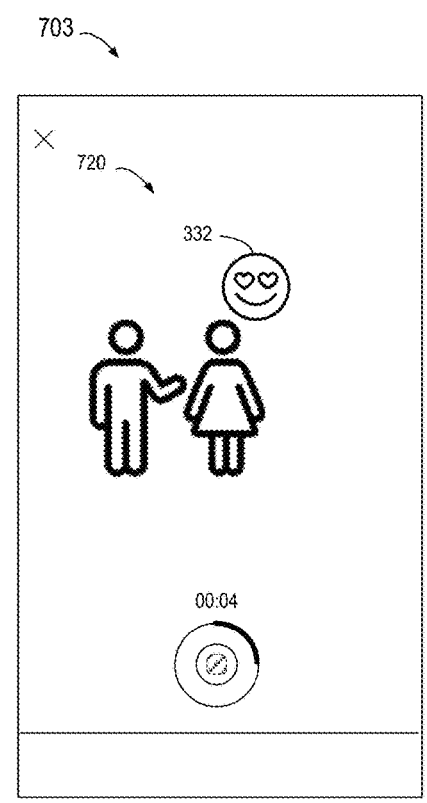
FIG. 7A
FIG. 7B

METHOD AND APPARATUS FOR CONTENT CAPTURING, DEVICE AND STORAGE MEDIUM

CROSS-REFERENCE TO RELATED APPLICATIONS

This application is a continuation of International Patent Application No. PCT/CN2023/092315, filed on May 5, 2023, which claims the benefit of Chinese Invention Patent Application No. CN202210754280.X, filed Jun. 28, 2022 and entitled "METHOD AND APPARATUS FOR CONTENT CAPTURING, DEVICE AND STORAGE MEDIUM".

FIELD

Example embodiments of the present disclosure generally relate to the field of multimedia processing, and in particular, to a method and an apparatus for content capturing, a device, and a computer-readable storage medium.

BACKGROUND

Currently, more and more applications are designed to provide various services to users. For example, a user may browse, comment, and forward various types of content in a content sharing application, including multimedia content such as videos, images, image sets, sounds, and the like. In addition, the content sharing application also allows a user to shoot and share media content, such as photos, videos, or animated images. During capturing of the media content, applications may provide a wide variety of capturing materials for user to select in order to create personalized media content.

SUMMARY

In a first aspect of the present disclosure, a method for content capturing is provided. The method includes: in response to determining that a first capturing material of at least a first type is selected, presenting a plurality of material identifiers corresponding to a plurality of capturing materials of at least a second type, the plurality of capturing materials being associated with the first capturing material; determining a selected capturing material in the plurality of capturing materials based on a selection operation on a material identifier in the plurality of material identifiers; and in response to determining that a second capturing material in the plurality of capturing materials is selected, presenting a first capturing preview comprising the first capturing material and the second capturing material.

In a second aspect of the present disclosure, an apparatus for content capturing is provided. The apparatus includes: a material presenting module configured to present, in response to determining that a first capturing material of at least a first type is selected, a plurality of material identifiers corresponding to a plurality of capturing materials of at least a second type, the plurality of capturing materials being associated with the first capturing material; a material selecting module configured to determine a selected capturing material in the plurality of capturing materials based on a selection operation on a material identifier in the plurality of material identifiers; and a first preview presenting module configured to present, in response to determining that a second capturing material in the plurality of capturing materials is selected, a first capturing preview comprising the first capturing material and the second capturing material.

In a third aspect of the present disclosure, an electronic device is provided. The apparatus includes at least one processing unit; and at least one memory coupled to the at least one processing unit and storing instructions for execution by the at least one processing unit. The instructions, when executed by the at least one processing unit, cause the device to implement the method of the first aspect.

In a fourth aspect of the present disclosure, a computer-readable storage medium is provided. The medium stores a computer program thereon, and when executed by the processor, the computer program implements the method in the first aspect.

It will be appreciated that the content described in this Summary section of the present disclosure is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein:

FIG. 6A to FIG. 6B are schematic diagrams of example pages related to content capturing according to some other embodiments of the present disclosure;

FIG. 7A to FIG. 7B are schematic diagrams of example pages related to content capturing according to some other embodiments of the present disclosure;

DETAILED DESCRIPTION

Figure 1:
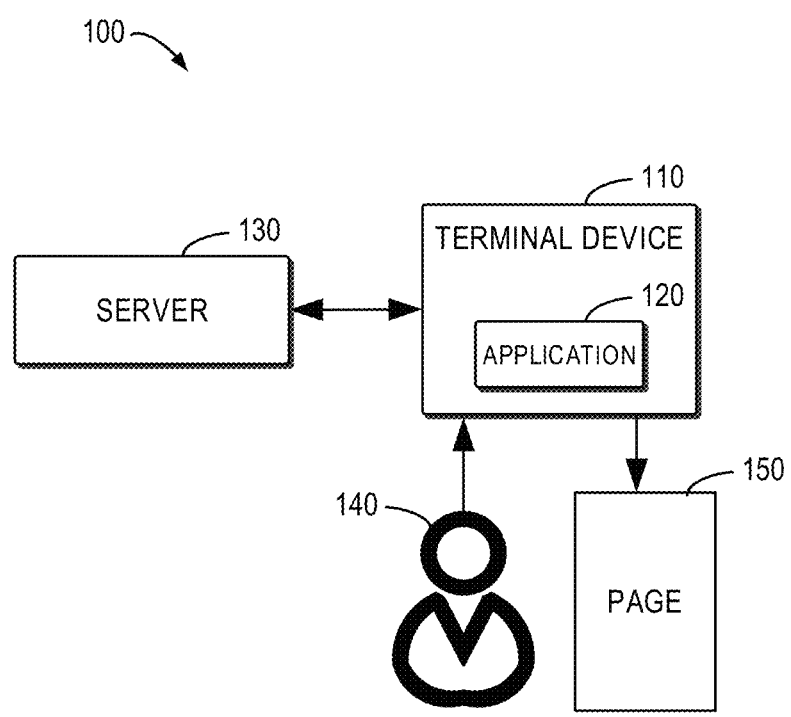
FIG. 1 illustrates a schematic diagram of an example environment in which embodiments of the present disclosure can be implemented.

Embodiments of the present disclosure will be described in more detail below with reference to the accompanying drawings. Although some embodiments of the present disclosure are shown in the drawings, it shall be understood that the present disclosure can be implemented in various forms and should not be construed as limited to the embodiments set forth herein. On the contrary, these embodiments are provided for a more thorough and complete understanding of the present disclosure. It shall be understood that the drawings and embodiments of the present disclosure are provided for illustrative purposes only and are not intended to limit the scope of protection of the present disclosure.

In the description of the embodiments of the present disclosure, the term "including" and the like should be understood as non-exclusive inclusion, that is, "including but not limited to". The term "based on" should be understood as "based at least in part on." The term "one embodiment" or "the embodiment" should be understood as "at least one embodiment". The term "some embodiments" should be understood as "at least some embodiments". Other explicit and implicit definitions may also be included below.

It will be appreciated that the data involved in the technical solution (including but not limited to the data itself, the obtaining or use of the data) should comply with the requirements of the corresponding legal regulations and related provisions.

It will be appreciated that, before using the technical solutions disclosed in the various embodiments of the present disclosure, the user shall be informed of the type, application scope, and application scenario of the personal information involved in this disclosure in an appropriate manner and the user's authorization shall be obtained, in accordance with relevant laws and regulations.

For example, in response to receiving an active request from a user, prompt information is sent to the user to explicitly prompt the user that an operation requested by the user will require obtaining and use of personal information of the user. Thus, the user can autonomously select, according to the prompt information, whether to provide personal information to software or hardware such as an electronic device, an application program, a server, or a storage medium that executes the operations of the technical solutions of the present disclosure.

As an optional but non-limiting implementation, in response to receiving an active request from the user, prompt information is sent to the user, for example, in the form of a pop-up window, and the pop-up window may present the prompt information in the form of text. In addition, the pop-up window may also carry a selection control for the user to select whether he/she "agrees" or "disagrees" to provide personal information to the electronic device.

It can be understood that the above notification and user authorization process are only illustrative, which do not limit the implementation of this disclosure. Other methods that meet relevant laws and regulations can also be applied to the implementation of this disclosure.

FIG. 1 illustrates a schematic diagram of an example environment 100 in which embodiments of the present disclosure can be implemented. In this example environment 100, an application 120 is installed in the terminal device 110. The user 140 may interact with the application 120 via the terminal device 110 and/or an attachment device of the terminal device 110. The application 120 may be a content sharing application, and it can provide various services related to multimedia content items to the user 140, including browsing, commenting, forwarding, creating (e.g., capturing and/or editing), and publishing multimedia content items, etc. Herein, "multimedia content items" include one or more types of content, such as videos, images, animated images, image sets, audios, text, and the like.

In an environment 100 of FIG. 1, the terminal device 110 may present a page 150 of the application 120 if the application 120 is active. The page 150 may include a page of any type that can be provided by the application 120, such as a multimedia content presentation page, a content creating page, a content publishing page, a message page, a personal page, or the like. The application 120 may provide a content creation function to shoot and/or create a multimedia content item, to enable a user to edit the shot or uploaded multimedia content, and/or the like. The application 120 may also have a publishing function that allows the user 140 to publish the created multimedia content.

In some embodiments, the terminal device 110 communicates with server 130 to enable provision of services to application 120. The terminal device 110 may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an electronic book device, a gaming device, or any combination of the foregoing, including accessories and peripherals of these devices, or any combination thereof. In some embodiments, the terminal device 110 may also support any type of interface for a user (such as a "wearable" circuit, etc.). The server 130 may be one of various types of computing systems/servers capable of providing computing power, including, but not limited to, mainframes, edge computing nodes, computing devices in a cloud environment, and the like.

It shall be understood that the structures and functions of the various elements in the environment 100 are described for exemplary purposes only, which do not imply any limitation to the scope of the present disclosure.

When capturing a multimedia content item, for example, capturing a video or a photo, the user may be allowed to set capturing materials used during capturing, for example, background music, a prop, a filter, a sticker, text and the like applied to a video or a photo. Currently, different entries to various types of capturing material libraries are provided in a capturing startup page. By triggering these entries, different types of capturing material libraries may be respectively shown for the user to select respectively. However, this process requires relatively complex, time-consuming user operations. If a certain type of capturing material library contains a large number of materials, the user may need to spend more time in browsing to find a suitable material. Moreover, during creating multimedia content, the user also needs to spend more time matching different types of capturing materials, so as to create a satisfactory work. In some cases, if the entries for capturing materials of a certain type or the capturing materials are arranged at the back or arranged not significant enough, the user may not even notice that these capturing materials can be used.

Some applications currently provide a function of capturing the same type as the existing multimedia content item. Through this function, one or more types of capturing materials in the multimedia content item that the user is interested in may be directly added to a new work to be shot by the user. However, if the user is not satisfied with a certain type of capturing material or needs to add other types of capturing materials, the user still needs to search from the capturing material library of the corresponding type, which brings inconvenience to the user and results in poor user experience.

According to an embodiment of the present disclosure, an improved solution for content capturing is provided. In this solution, if a particular capturing material of a type is selected, a plurality of capturing materials of another type associated with the selected capturing material is presented for selection. If a certain capturing material in the presented plurality of capturing materials of the further type is also selected, a capturing preview is presented, and the capturing preview includes the selected different types of capturing materials. According to the solution, the user can conveniently and flexibly select the capturing material expected to be used from a smaller set of capturing materials of another type, and it can also be ensured that the selected multiple types of capturing materials are relatively more associated, thus having high matching degree. Therefore, the user can more conveniently and quickly perform material selection and content creation, and the capturing experience of the user is improved.

Some example embodiments of the present disclosure will be described below with continued reference to the accompanying drawings.

Figure 2:
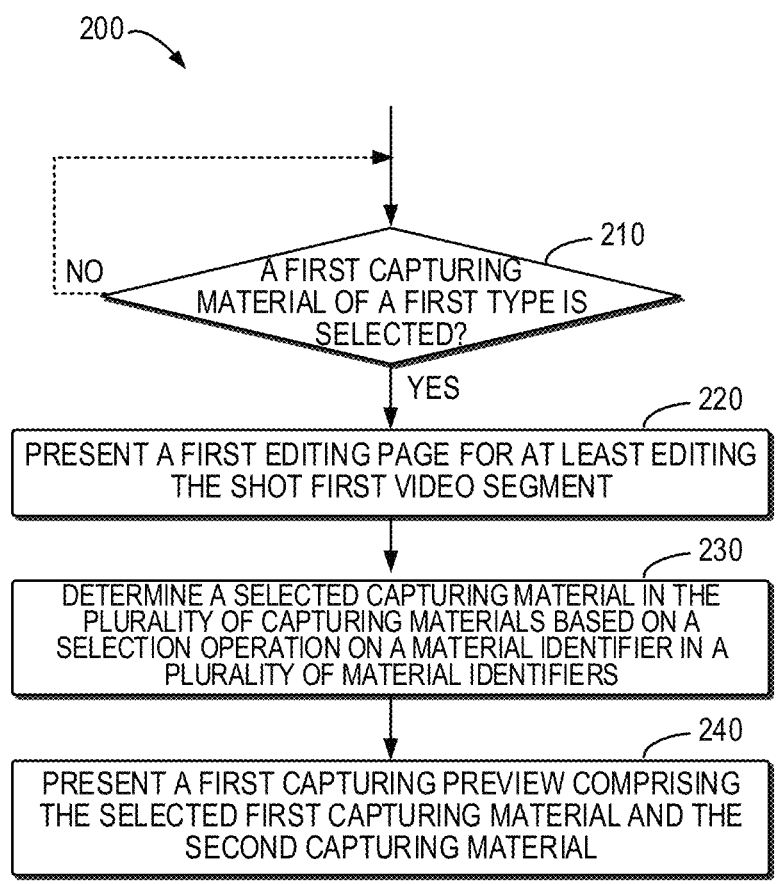
FIG. 2 illustrates a flowchart of a process for content capturing according to some embodiments of the present disclosure.

FIG. 2 illustrates a flowchart of a process 200 for content capturing according to some embodiments of the present disclosure. The process 200 may be implemented at terminal device 110. For case of discussion, the process 200 will be described with reference to the environment 100 of FIG. 1.

At block 210, the terminal device 110 determines whether a first capturing material of a first type is selected.

Herein, the "capturing materials" refers to materials that can be added to a multimedia content item to be shot, including visual materials and/or audial materials. The capturing materials may be divided into multiple types, and different types of capturing materials may be applied to the same multimedia content item at the same time to provide rich content from multiple aspects. Examples of types of the capturing materials may include background audios, such as background music, background speech, or other types of audios. The types of capturing materials may also include props, filters, text, stickers, special effects, capturing templates, and any other materials that may be added to the multimedia content item.

The capturing materials of different types may include a plurality of selectable capturing materials. The capturing materials of a prop type may include an overall package to the capturing materials for adding a static or dynamic object in the picture, providing an interactive effect, changing a color contrast of the picture and makeup of a person, and the like. The capturing material of a filter type may be used to adjust the color curve of the picture to present different filter effects. The capturing material of a text type may add text of various styles to the shot picture, and the capturing material of a sticker type may add various styles of dynamic or static stickers to the shot picture. The capturing material of a special effect type may include a video special effect and/or an audio special effect to change a presentation effect of the picture and/or the sound. The capturing material of the capturing template type may control a narrative effect on the shot video or image set, for example, a cut-scene and transitions effects, picture texture, special effect style, opening and ending control, subtitles, and so on.

Only some examples of capturing materials are given above. According to different application requirements and configuration rules, the capturing materials may be classified according to other rules, and more, less, or other types of capturing materials may be provided.

In some embodiments, the application 120 installed on the terminal device 110 may provide a capturing function for capturing a multimedia content item, such as a video, an image, a moving picture, or the like. When a capturing request is triggered, the capturing material for capturing may be determined. In some embodiments, the application 120 may provide multiple entries for triggering a capturing request, such as providing entries for triggering a capturing request in various pages of the application. In some examples, an entry for triggering a capturing request may include a capturing startup control, a same type capturing entry in a detail page of a specific multimedia content item or capturing material, a co-capturing entry for a specific multimedia content item, and the like. The entry for triggering a capturing request may be set at an appropriate page or a page location in the application as needed.

To better understand the example embodiments, an example page of a reference application is described below.

Figure 3A:
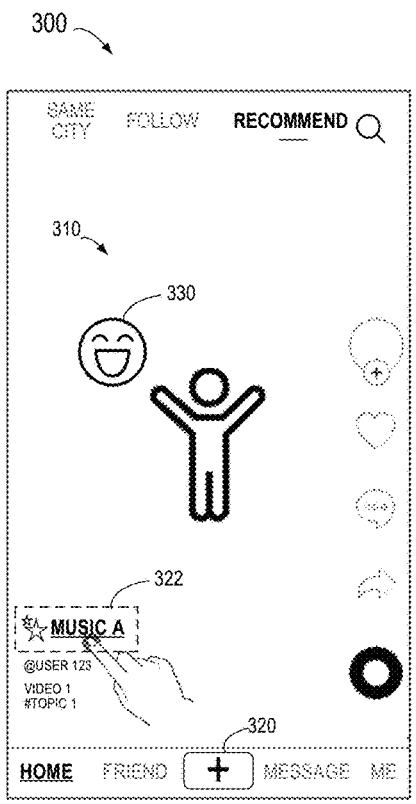
FIG. 3A to FIG. 3D are schematic diagrams of example pages related to content capturing according to some embodiments of the present disclosure.

FIG. 3A illustrates an example page 300 of an application 120. The page 300 may be any page of the application 120. In the example of FIG. 3A, the page 300 is an information flow presentation page in which a multimedia content item 310 shared by a user is presented. In this example, the capturing materials of the multimedia content item 310 includes at least background music and props 330, and these capturing materials provide rich visual and audial experiences. In the page 300, there is also provided a detail page entry 322 for the background music "Music A" used by the multimedia content item 310. The page 300 includes a capturing startup control 320 configured to trigger a presentation of a capturing startup page, so as to start capturing of the multimedia content item.

It shall be understood that the page 300 of FIG. 3A and the pages in other figures described below are merely example pages, and various page designs may exist. Individual graphical elements in a page may have different arrangements and different visual representations, in which one or more of the graphical elements may be omitted or replaced, and one or more other elements may also be present. Embodiments of the present disclosure are not limited in this respect. It should also be understood that, in addition to the example page 300, a capturing startup control may be presented in another page of the application 120, and/or a capturing startup instruction may be initiated in other ways.

Figure 3B:
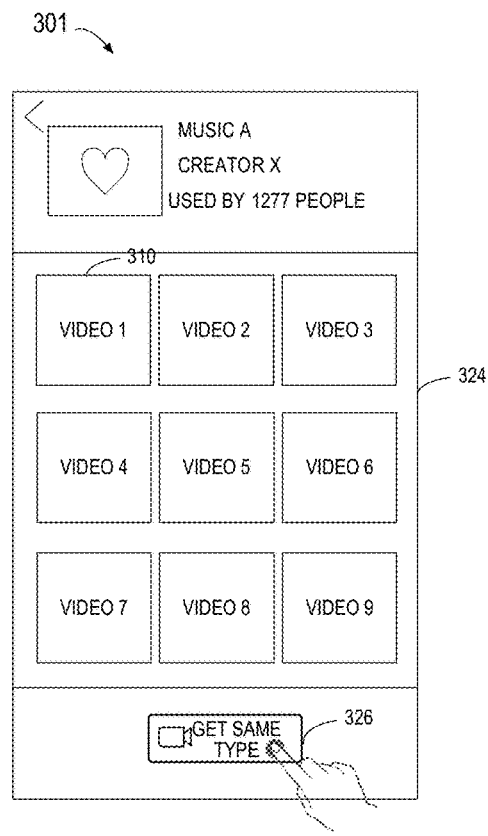

In some cases, if the user browses to the multimedia content item 310 and is interested in the background music "Music A" used therein, the detail page entry 322 for the "Music A" may be triggered by clicking on the entry 322, for example. In response to receiving a trigger indication for the detail page entry 322, the terminal device 110 presents a detail page 301 of the "Music A" as shown in FIG. 3B. Note that in addition to entering the detail page 301 of the "Music A" from page 310, the application 120 may provide a variety of other ways to enter the detail page 301.

More information related to the "Music A" may be provided in the detail page 301, such as a cover, a creator, the number of people who use the "Music A", and the like. The detail page 301 may also provide a presentation interface 324 for a multimedia content item that uses "Music A" as its background music, for the user to view.

The detail page 301 of "Music A" is also presented with a "Get Same Type" control 326 for the user to trigger to shoot the same type of content as the multimedia content item of current interest. If the user triggers the "Get Same Type" control 326, the terminal device 110 will detect the same type capturing request for the multimedia content item of interest. In some embodiments, if the user enters the detail page 301 from the multimedia content item 310, it may be determined by default that the user is interested in the multimedia content item 310. In some embodiments, if it is detected that the user triggers the same type capturing request again after selecting other multimedia content items in the detail page 301, it may be determined that the user is interested in the selected multimedia content item.

Figure 3C:
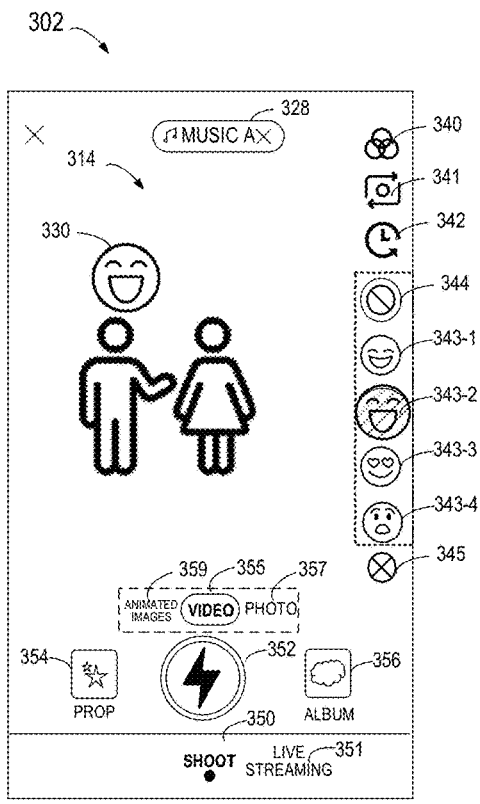

In a case that the same type capturing request for the multimedia content item of interest is detected, a specific capturing material in the multimedia content item is selected by default for capturing. After detecting the same type capturing request, the terminal device 110 presents a capturing startup page 302, as shown in FIG. 3C, where a background audio selection box 328 indicates that the "Music A" is selected as the background audio.

Figure 4A:
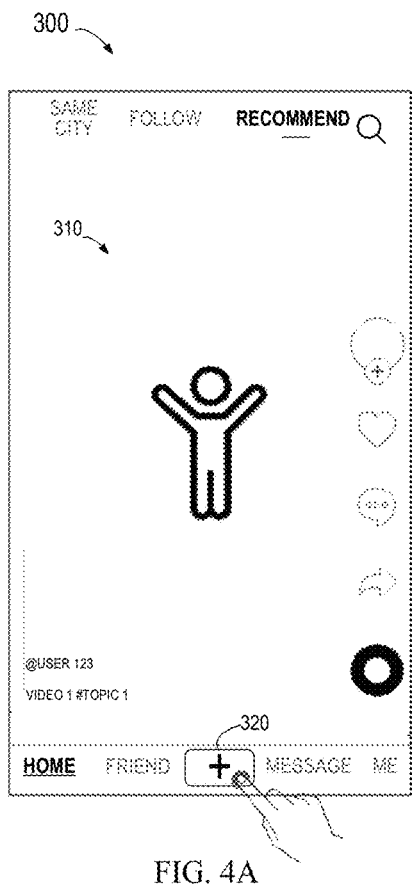
FIG. 4A to FIG. 4D are schematic diagrams of example pages related to content capturing according to some other embodiments of the present disclosure.
Figure 4B:
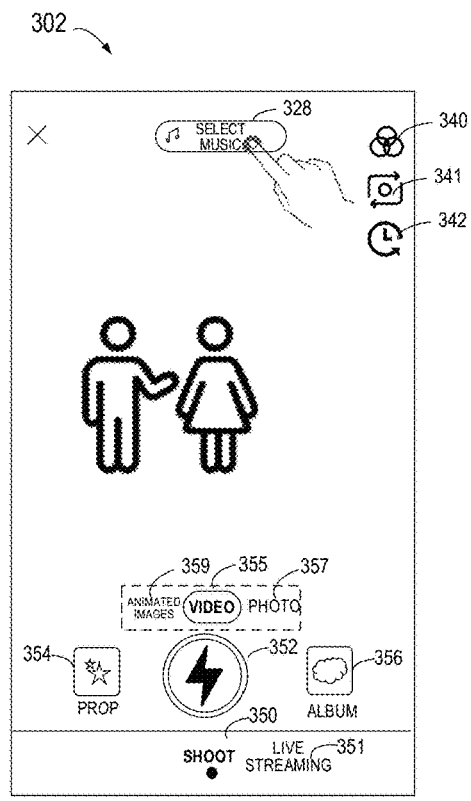
Figure 4C:
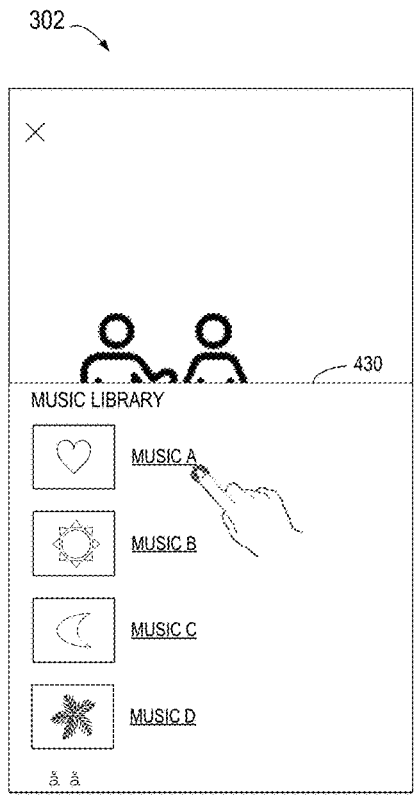
Figure 4D:
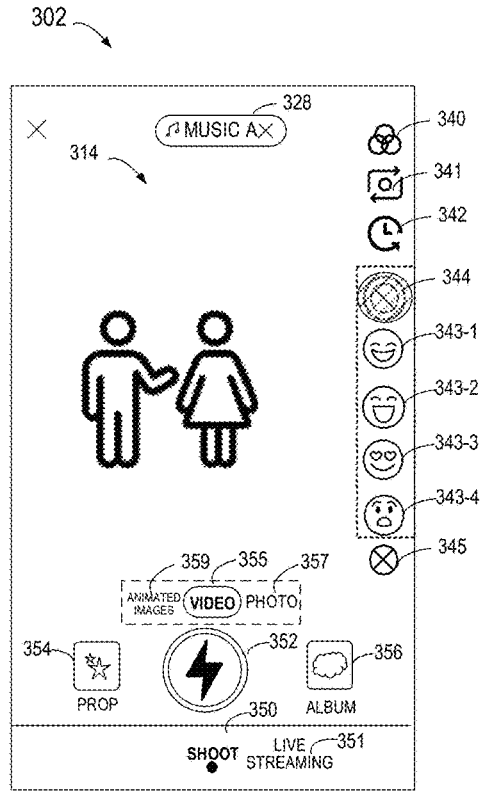

In some embodiments, as shown in FIG. 4A, if the user triggers (e.g., clicks on) the capturing startup control 320 in the page 300, the terminal device 110 will detect a capturing startup indication and presents the capturing startup page 302 as shown in FIG. 4B. In the capturing startup page 302 of FIG. 4B, the user may select background music for capturing, for example, by clicking the background audio selection box 328. Upon clicking on the background audio selection box 328, a background audio selection interface may be presented, such as the background audio selection interface 430 shown in FIG. 4C, where a plurality of background audios are listed. If the user selects the background audio "Music A", as shown in FIG. 4D, in the capturing startup page 302, the background audio selection box 328 indicates that the "Music A" is selected as the background audio.

In response to determining that a first capturing material of at least a first type is selected, at block 220, the terminal device 110 presents a plurality of material identifiers corresponding to a plurality of capturing materials of at least a second type. The plurality of capturing materials to be presented are associated with the selected first capturing material.

In an embodiment of the present disclosure, in a case where a capturing material of a certain type has been selected, a plurality of capturing materials of an additional type associated thereto are initiatively recommended for the user to select. In some embodiments, the user may be allowed to select various capturing materials for capturing in the capturing startup page. Therefore, material identifiers corresponding to the plurality of capturing materials of another type may be presented in the capturing startup page. Herein, the "material identifier" may be any form of identification information, such as text, numbers, and/or icons, as long as different capturing materials can be identified.

In some embodiments, the second type of capturing materials may be different from the first type of capturing material. For example, the first type of capturing material may be background audio, and the second type of capturing materials may be props, filters, or others. In some embodiments, a plurality of other types (for example, the second type and the third type) of capturing materials associated with the selected capturing material may be presented, for example, the material identifiers corresponding to one or more props and one or more filters may be presented together. In some embodiments, in a case where multiple types of capturing materials have been selected by a user, for example, in a case where both the first type and the third type of capturing materials have been selected, other types (for example, the second type) of capturing materials are recommended to the user, for example, by presenting material identifiers corresponding to these other types of capturing materials.

In some embodiments, the presented capturing materials of the second type may be a subset of all available capturing materials of the second type, and the capturing materials may be considered as matching the capturing material of the type currently selected by the user.

For explanatory purposes, in some examples herein, it is assumed that capturing materials of the prop type is recommended in the case where the capturing material of the background audio type is selected. However, it shall be understood that the types and selection sequences of these capturing materials are not limited herein. In other embodiments, in a case that another type of capturing material (e.g., prop type or filter type, etc.) is determined to be selected, other types of capturing materials associated thereto (e.g., a plurality of background audios suitable for the currently selected prop or filter) may be presented. These specific implementations may be set as needed, and embodiments of the present disclosure are not limited in this respect.

In some embodiments, the first type may be configured as a specific type of capturing material, and/or the second type may also be configured as a specific type of capturing material. That is, only when determining that a certain specific type or some specific types of capturing materials are selected, other specific types of capturing materials are recommended for the user to select. In some embodiments, such a special configuration may not be performed, but the association relationship may be set between various types of capturing materials that may be provided, and when a capturing material of any type is selected, capturing materials of another type or some other types are presented for the user to select.

In some embodiments, if a certain capturing material of the second type and the currently selected capturing material of the first type are included in the same multimedia content item, the capturing material of the second type may be determined as the candidate capturing material associated with the selected capturing material of the first type. A set of candidate capturing materials associated with the selected capturing material of the first type may be determined in this manner. In some embodiments, considering that the interface for presenting the associated capturing materials may be relatively limited, a plurality of capturing materials may be selected from the set of candidate capturing materials of the second type for presentation.

In some embodiments, the plurality of capturing materials for presentation may be selected based on the popularities of the set of candidate capturing materials of the second type. In some examples, the popularity of a candidate capturing material may be measured based on the number of times or a frequency that the candidate capturing material is used, or based on the number of times or a frequency that the candidate capturing material is used together with the currently-selected capturing material of the first type. The higher the number of times or the frequency, the higher the popularity of the candidate capturing material. In some embodiments, a predetermined number of the candidate capturing materials with the highest popularity may be selected for presentation.

In some embodiments, additionally or alternatively, the plurality of capturing materials for presentation may also be selected based on user interaction behaviors related to the set of candidate capturing materials of the second type. The user interaction behaviors may include, for example, a collecting behavior, a liking behavior, a sharing behavior, and a commenting behavior of the user, and the like. For example, if a user has collected a certain candidate capturing material, or if a user has collected a multimedia content item including the candidate capturing material, the candidate capturing material may be selected for presentation. In an example considering a plurality of interaction behaviors, candidate capturing materials may be scored based on different interaction behaviors, and a candidate capturing material with a higher score may be selected for presentation. More interaction behaviors means that the candidate capturing material is more likely to be selected by the user. In this way, the capturing materials are selected for presentation, which is convenient for the user to shoot.

In some embodiments, the plurality of capturing materials of the second type to be presented may be selected based on the popularities of the candidate capturing materials and the related user interaction behaviors. In other embodiments, other factors may also be considered to determine the plurality of capturing materials of the second type for presentation.

The presentation of the capturing materials of the second type will be described below with reference to the example page.

Referring to the example of FIG. 3C, if a user desires to shoot new content that includes a certain capturing material (e.g., background audio) in the multimedia content item of interest, in addition to indicating in the capturing startup page 302 that the same background audio "Music A" is selected, a plurality of capturing materials of another type are presented in capturing materials of the second type, such as prop identifiers 343-1, 343-2, 343-3, 343-4, etc. corresponding to a plurality of props (which may sometimes be collectively referred to as prop identifiers 343 for ease of discussion). Props indicated by these prop identifiers are considered as being associated with or matched with the currently selected "Music A."

In some embodiments, the plurality of material identifiers corresponding to the plurality of recommended capturing materials of the second type may be presented in a sidebar of a page (for example, a capturing startup page). Depending on the page size and configuration, one or more material identifiers may be hidden and re-presented according to user interaction. As shown in FIGS. 3C and 4D, a plurality of prop identifiers 343 are presented in the right sidebar of the capturing startup page 302. Of course, according to the actual page design requirement, the material identifiers may also be presented at other sidebars or other locations of the page.

In some embodiments, entries for selection interfaces for various capturing settings related to capturing or capturing materials may also be presented in the capturing startup page. For example, as shown in FIG. 3C and FIG. 4D, the capturing startup page 302 may further be presented with an entry 340 for the filter selection interface, which is configured to trigger the display of the filter selection interface to show a plurality of selectable filters; a lens flipping function 341 configured to switch a front lens or a rear lens of a camera; and a timer function 342 configured to set a countdown for capturing. The capturing startup page 302 may include an entry 354 for a prop selection interface, configured to trigger the display of a prop selection interface to show a plurality of selectable props; and an album entry 356, configured to access the multimedia content in the local data source or other data sources for subsequent creation.

In some embodiments, the capturing startup page 302 may also be provided with another control for controlling content capturing. For example, in FIG. 3C and FIG. 4D, in the capturing startup page 302, a capturing control 352 is further presented, and the capturing may be started by triggering the capturing control 352.

In some examples, the capturing startup page 302 corresponds to a capturing entry 350, and where other camera-related function entries, such as a live streaming entry 351 shown in FIGS. 3C and 4D, may also be provided. If a selection for the live streaming entry 351 is detected, the live streaming page is switched to. In some embodiments, the capturing startup page 302 may also provide different capturing modes under a capturing function, such as a video capturing mode 355, a picture capturing mode 357, a moving picture capturing mode 359, and the like. In FIGS. 3C and 4D, the video capturing mode 355 may be selected by default after entering the capturing start page 302, and the user may also be allowed to switch to another capturing mode.

It shall be understood that the functions shown here are merely examples, and more, fewer, or different functions may be provided in the capturing startup page 302, and the embodiments of the present disclosure are not limited in this regard. For example, in addition to the entry to the prop selection interface and the entry to the filter selection interface, other types of the entry to the capturing material selection interface may also be provided, such as text, stickers, and the like.

In some embodiments, if in addition to the capturing material of the first type, a capturing material of at least a second type (such as a capturing material of a prop type) is also included in the multimedia content item of interest of a type same as that of a multimedia content item to be shot, the capturing material of the second type may also be determined as a recommended capturing material of the type, and a material identifier of the capturing material is also presented. In some embodiments, a capturing material of the second type included in the multimedia content item of interest is selected by default. As shown in FIG. 3C, since the multimedia content item 310 of interest includes not only "Music A" but also the prop 330, the prop identifier 343-2 corresponding to the prop 330 is presented on the page 302. In addition, the prop identifier 343-2 may also be presented as in a being selected state to indicate that the corresponding prop 330 is selected.

In some embodiments, a capturing preview comprising the selected capturing material may also be provided. For example, in the example of FIG. 3C where the "Music A" is selected and the prop 330 is selected by default, a capturing preview 314 including the "Music A" and the prop 330 may be provided.

In some embodiments, if the multimedia content item of interest does not include the capturing material of the second type or the capturing material of the second type selected by default is not determined, the capturing preview may not include the capturing material of the second type selected by default. For example, in the example of FIG. 4A to FIG. 4D, after the "Music A" is selected, a prop selected by default is not provided, so that the capturing material of the prop type is not included in the capturing preview 314 of FIG. 4D.

In some embodiments, a deactivation function for deactivating the second type of capturing materials may also be presented in association with the plurality of material identifiers. The triggering indication for the deactivation function triggers deactivation of a capturing material of the second type, so that the capturing material of the second type is no longer used for capturing. As shown in FIGS. 3C and 4D, the deactivation function 344 is presented for deactivating a capturing material of the second type, i.e., indicating that no capturing material of the second type is selected for capturing. In an example of FIG. 4D, after the prop identifiers 343 corresponding to the plurality of props are presented, the deactivation function 344 is presented as in a being selected state because there is no second type of capturing material selected by default in this scenario.

With continued reference to the process 200 of FIG. 2, at block 230, a selected capturing material in the plurality of capturing materials is determined based on a selection operation on a material identifier in a plurality of material identifiers.

The material identifiers corresponding to the presented capturing materials of the second type may be selected by the user for capturing as needed. Although some types of entries for the capturing material selection interface (for example, filters, props, etc.) may also be provided in the capturing startup page, more interaction operations are required after the capturing material selection interface is triggered through these entries, and the user needs to spend more time to find the capturing materials meeting the requirement from a large number of capturing materials. According to an embodiment of the present disclosure, after a capturing material of at least a first type is selected, material identifiers corresponding to a plurality of associated capturing materials of at least a second type is initiatively presented for the user to select. In this way, the user can select the desired capturing material more conveniently and flexibly.

In some embodiments, the selection operation on the plurality of material identifiers may be performed by a predetermined type of interaction gesture. In some embodiments, the predetermined type of interaction gesture for material switching may include a sliding gesture and/or a clicking gesture. In some examples, in some embodiments, the type of the sliding gesture may include a leftward sliding gesture, a rightward sliding gesture, an upward sliding gesture, a downward sliding gesture, or a sliding gesture with another specific trajectory. The type of the sliding gesture selected may be based on the arrangement manner of the material identifier, and it may also be required to avoid conflict with the interaction gestures used by other functions in the page. For example, in the examples of FIGS. 3C and 4D, different material identifiers may be selected and switched using an upward sliding gesture and a downward sliding gesture. In some examples, a clicking gesture may also be supported to select or switch to a corresponding material identifier.

In other embodiments, the selection operation on the plurality of material identifiers may further be another type of interaction gesture supported by the terminal device, such as an eye movement interaction gesture, a face gesture interaction gesture, and the like.

In some embodiments, material identifiers corresponding to a plurality of capturing materials of the second type and a deactivation function used to trigger to deactivate the capturing material of the second type may be selected and switched by a specific type of interaction gestures. For example, in the examples of FIGS. 3C and 4D, a switch may be made between the plurality of prop identifiers 343 and the deactivation function 344 by upward and downward sliding gestures.

Figure 3D:
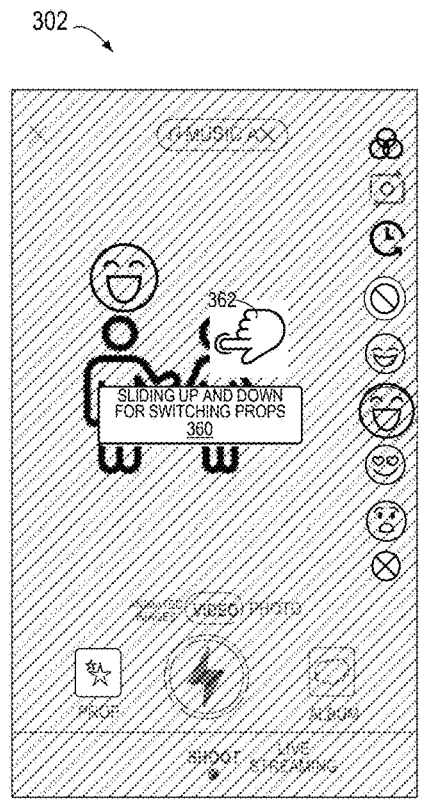

In some embodiments, for the user to know the selection and switching manner of the presented material identifiers, guidance information about material switching may be provided. As shown in FIG. 3D, a guidance mask layer is provided in the capturing startup page 302, where the guidance mask layer includes text guidance information 360 and animation gesture guidance 362 for guiding a user to switch a prop. In some embodiments, such guidance information may be provided when the material identifier corresponding to the recommended capturing material is presented for the first time, or such guidance information may be provided at each presentation. The scope of embodiments of the present disclosure is not limited in this respect.

In some embodiments, after presenting the plurality of material identifiers corresponding to the plurality of capturing materials of the second type, if a certain material identifier is currently selected (for example, selected by default or manually selected by the user), the terminal device 110 may detect a predetermined type of interaction gesture for material switching. If the predetermined type of interaction gesture indicates to switch the currently selected material identifier to another material identifier, it may be determined that the capturing material corresponding to the further material identifier is selected, that is, the selected "second capturing material" of the second type may be determined. In this way, through a predetermined type of interaction gestures, a plurality of material identifiers can be flexibly switched to each other, thereby different capturing materials can be flexibly selected and switched.

Figure 5A:
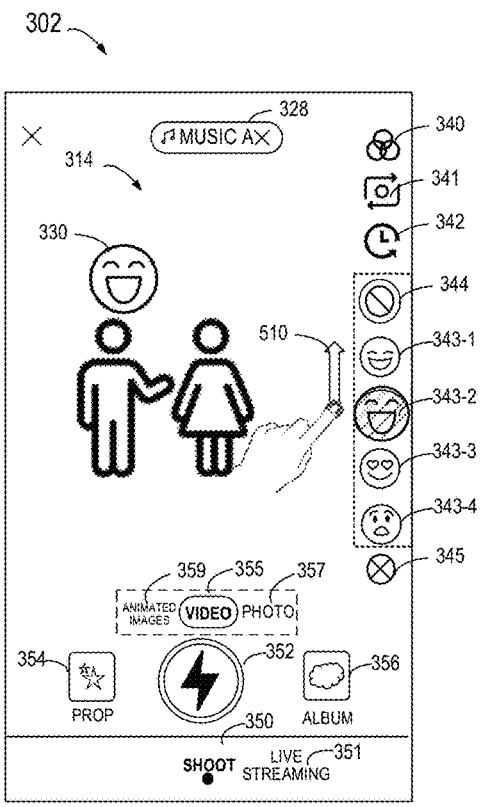
FIG. 5A to FIG. 5E are schematic diagrams of example pages related to content capturing according to some other embodiments of the present disclosure.
Figure 5B:
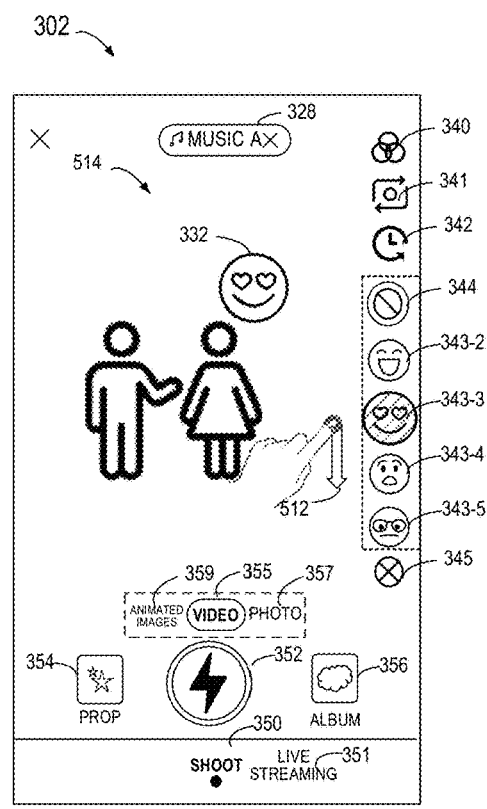

As shown in FIG. 5A, in this example, it is assumed that the prop 330 corresponding to the prop identifier 343-2 is selected by default (for example, since the user expects to shoot the same-type content as the multimedia content item 310 of interest). If a user's upward sliding gesture 510 is detected that indicates a switch from the prop identifier 343-2 to a downwardly adjacent prop identifier 343-3, it may be determined that the prop 332 corresponding to the prop identifier 343-3 is selected. As shown in FIG. 5B, the prop identifier 343-3 is presented as being in a selected state. After the material identifier is switched by sliding, the hidden material identifiers below may be presented in sequence, and the above material identifiers slid out of the display area may be hidden. For example, the prop identifier 343-1 is hidden in FIG. 5B, and another prop identifier 343-5 arranged below the prop identification 343-4 is presented.

With continued reference to process 200, at block 240, if it is determined that a second capturing material in the plurality of capturing materials is selected, the terminal device 110 presents a first capturing preview comprising the selected first capturing material and the second capturing material.

For example, in the example of FIG. 5A, if it is detected that the prop 332 corresponding to the prop identifier 343-3 is selected, a capturing preview 514 may be presented, which includes the currently selected capturing material of the first type, that is, the "Music A", and the capturing material of the second type, that is, the prop 332. For example, in the capturing preview 514, the "Music A" may be played and the visual effect (or animation effect, if any) of the prop 332 may be presented.

In some embodiments, if a certain capturing material is determined to be selected, the material identifier corresponding to the selected capturing material may be highlighted. Herein, the highlighting of the material identifier refers to that the presentation manner of a selected material identifier makes it easier to be recognized, as compared with the presentation manner of an unselected material identifier. The material identifier may be highlighted in one or more manners. In some embodiments, highlighting the material identifier may be reflected in a presentation location and/or appearance of the material identifier. For example, the material identifier in the being selected state may be moved to a position that is more easily to be noticed by the user among all the presented material identifiers, such as a more centered position in the list. As another example, the appearance of one or more aspects of the selected material identifier may additionally or alternatively be distinguished from other material identifiers that are not selected. For example, an additional visual pattern may be added to the selected material identifier to change the color, shape, texture, shading, size, etc. of the selected material representation. The selected material identifier may also be highlighted in any other way.

For example, in an example of FIG. 5B, the prop identifier 343-3 in the selected state is moved upward and amplified, and is also attached with a shading different from the other prop identifiers. In some examples, in addition to a material identifier selected by the user, the selected material identifier or the triggered deactivation function may also be highlighted. For example, in the example of FIG. 5A, the prop identifier 343-2 selected by default may also be highlighted, while in the example of FIG. 4D, the deactivation function 344 in the selected state is also highlighted.

In some cases, the user may switch the capturing materials of the second type multiple times, such as by a predetermined type of interaction gesture for material switching. If it is detected that a material identifier corresponding to another capturing material of the second type is selected, the corresponding material identifier may be highlighted and a capturing preview comprising another capturing material may also be switched to. If the first capturing material of the first type is still selected, the capturing preview switched to may still include the first type of the first capturing material.

Figure 5C:
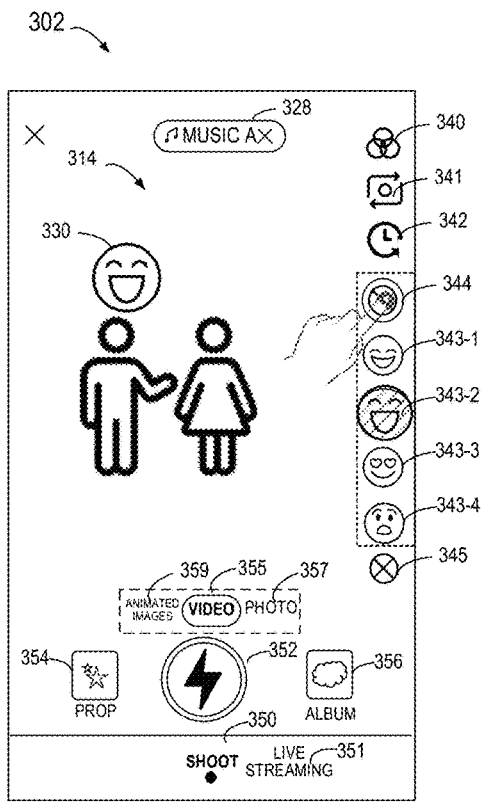

For example, in FIG. 5B, in a case where the "Music A" is still selected, if a downward sliding gesture 512 from the user is detected indicating switching from the current prop identifier 343-3 to the upwardly adjacent prop identifier 343-2, it may be determined that the prop 330 corresponding to the prop identifier 343-2 is selected again. As shown in FIG. 5C, the prop identifier 343-2 is presented as being in the selected state and the capturing preview 514 of FIG. 5B is switched to the capturing preview 314 including the "Music A" and the prop 330. Of course, if the user's selection for another prop identifier is detected in FIG. 5B, the capturing preview comprising another prop identifier and the "music A" may be switched to from the capturing preview 514.

When the capturing material of the second type is not recommended, if the user switches and selects the capturing materials in the capturing material selection interface of the second type, the identifier of the entry may be dynamically changed to the capturing material currently selected by the user. For example, in the examples of FIG. 5A to FIG. 5C, the icon of the entry 354 for the prop selection interface changes with the props selected by the user in the prop selection interface, for example, the icon indicates a prop identifier corresponding to the currently selected prop. In a case that the capturing material of the second type is additionally presented according to an embodiment of the present disclosure, even if the user switches and selects the prop identifier 343, the identifier of the entry to the capturing material selection interface is kept unchanged, which can avoid user confusion, and enable the user to notice the switching between the prop identifiers 343.

Figure 5D:
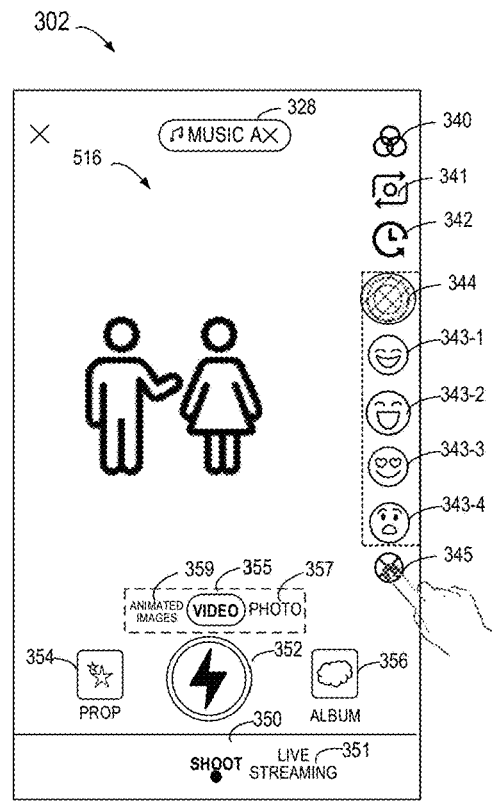

In some embodiments, if a deactivation indication for deactivating the second type of capturing materials is detected, the capturing preview comprising the selected capturing materials of the first type and the second type is switched to another capturing preview, and the capturing preview being switched to does not include the capturing material of the second type, but includes the selected capturing material of the first type. For example, if the triggering indication for the deactivation function 344 as shown in FIG. 5C is detected, it is switched from the capturing preview 314 of FIG. 5C to the capturing preview 516 shown in FIG. 5D, which still includes the "Music A", but does not include the capturing material of the prop type, that is, the presentation of the prop 330 is stopped.

Figure 5E:
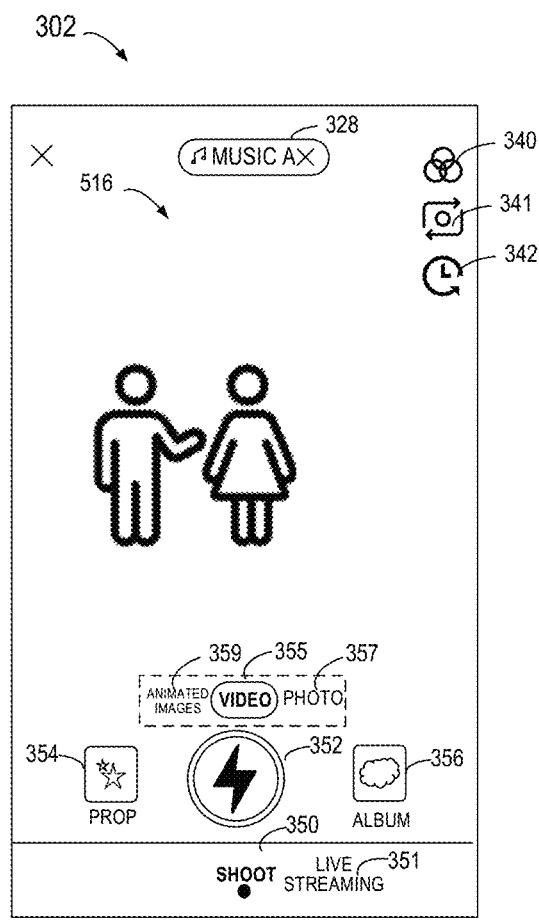

In some embodiments, in addition to the material identifiers corresponding to the capturing materials of the second type and the deactivation function, a control for stopping presentation of material identifiers may be presented. For example, in the examples of FIG. 3C, FIG. 4D, and FIG. 5A to FIG. 5D, the capturing startup page 302 further includes a presentation stopping control 345. Triggering the presentation stopping control will trigger a presentation stopping indication for material identifiers. Triggering the presentation stopping indication means that the user no longer desires to switch or select from the recommended capturing materials of the second type. Therefore, the presentation of the material identifiers corresponding to the capturing materials of the second type may be stopped. For example, if a triggering indication for the presentation stopping control 345 is detected in FIG. 5D, the presentation of a plurality of prop identifiers 343 are stopped in the capturing startup page 302, as shown in FIG. 5E. In addition, the deactivation function 344 for deactivating the second type of capturing materials and the presentation stopping control 345 for stopping presentation of the material identifiers are no longer presented.

In some cases, if a certain capturing material of the second type has been selected before the presentation stopping indication is detected, the selected capturing material of the second type may still be in the selected state after the presentation of the material identifier and other functions are stopped, which may be used for capturing. For example, the selected capturing material of the second type may continue to be presented in the capturing preview.

In some embodiments, if in the page, for example, if the capturing startup page further includes an entry to capturing material selection interface of the second type, the capturing material selection interface may be presented if a triggering indication for the entry is detected, and the presentation of the plurality of material identifiers are stopped. Since, on one hand, the user may select a capturing material of the second type that is expected to be used from the presented capturing material selection interface, on the other hand, the triggering of the capturing material selection interface may indicate that the user does not expect to use the plurality of capturing materials currently recommended in the page, but expect to select other capturing materials of the second type. The presented capturing material selection interface may include all available capturing materials of the second type. As shown in FIG. 6A, a triggering indication of the user on an entry 354 of a prop selection interface is detected. In response to the triggering indication, a props selection interface 620 as shown in FIG. 6B is presented in the capturing startup page 302, where all props available to the application 120 may be found and selected.

In some embodiments, if a certain capturing material of the second type is selected when the triggering indication for the entry of the capturing material selection interface is detected, for example, as shown in FIG. 6A, when the prop 332 corresponding to the prop identifier 343-3 is selected when the entry 354 is triggered, the material identifier corresponding to the capturing material may be highlighted in the capturing material selection interface. As shown in FIG. 6B, in the prop selection interface 620, the prop identifier 343-3 is presented at the first position, and the prop corresponding to the prop identifier may be indicated by adding a shading. Certainly, the selected capturing material of the second type may also be highlighted in other manners.

In some embodiments, if an entry triggering indication for capturing material selection interface of another type other than the second type is detected, or a triggering indication for another function in the capturing startup page is detected, the presentation of the material identifier corresponding to the capturing material of the second type may continue to be maintained. In this way, after selecting other types of capturing materials, the user may continue to select or change the capturing material of the second type to be used. For example, if in an example of FIG. 6A, it is detected that the user triggers the entry 340 for the filter selection interface, triggers an entry to album 356, or triggers a flipping function 341, and presenting of the prop identifier 343 may be maintained in the capturing startup page 302.

In some embodiments, in the capturing startup page, if the user has selected capturing materials of the first type, the second type, and/or other possible types, the capturing indication may be triggered. For example, the capturing indication may be triggered by triggering a capturing control. In response to detecting the capturing indication while a capturing material of a type is selected, the selected capturing material may be used for capturing, for example, capturing a video, an image or a moving picture. As shown in FIG. 7A, a triggering indication of the user on the capturing control 352 is detected. When the trigger indication is detected, the capturing mode is a video capturing mode, and the capturing material of the music type is the "Music A", and the capturing material of the prop type is the prop 332. Therefore, as shown in FIG. 7B, in the capturing page 703, the "Music A" may be used as background music, and the video may be started to be shot by using the prop 332.

Figure 8:
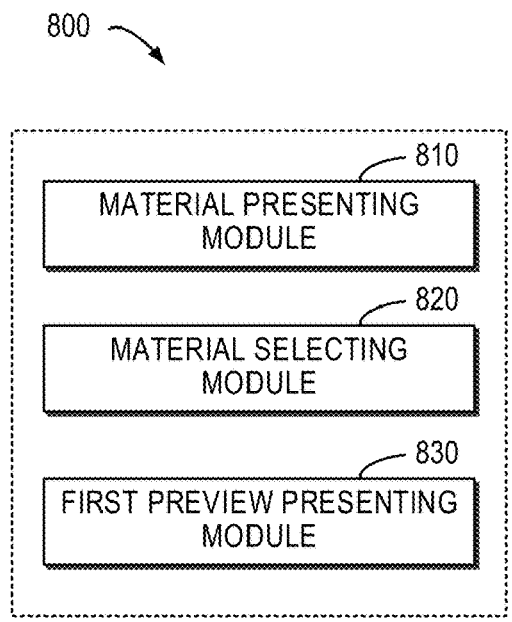
FIG. 8 illustrates a block diagram of an apparatus for content capturing according to some embodiments of the present disclosure.

FIG. 8 illustrates a schematic structural block diagram of an apparatus 800 for content capturing according to some embodiments of the present disclosure. The apparatus 800 may be implemented or included in the terminal device 110. The various modules/components in the apparatus 800 may be implemented by hardware, software, firmware, or any combination thereof.

The apparatus 800 includes a material presenting module 810 configured to present, in response to determining that a first capturing material of at least a first type is selected, a plurality of material identifiers corresponding to a plurality of capturing materials of at least a second type, the plurality of capturing materials being associated with the first capturing material. The apparatus 800 further includes a material selecting module 820 configured to determine a selected capturing material in the plurality of capturing materials based on a selection operation on a material identifier in the plurality of material identifiers; and a first preview presenting module 830 configured to present, in response to determining that a second capturing material in the plurality of capturing materials is selected, a first capturing preview comprising the first capturing material and the second capturing material.

In some embodiments, the apparatus 800 further includes: a first capturing material determining module configured to determine, in response to in response to detecting a same type capturing request for a multimedia content item of interest, that the first capturing material included in a video of interest is selected.

In some embodiments, in response to the multimedia content item of interest including a third capturing material of the second type, the plurality of capturing materials at least includes the third capturing material.

In some embodiments, the apparatus 800 further includes: a default material determining module configured to determine, in response to the first capturing material being selected, that the third capturing material is selected by default; and a second preview presenting module configured to present a second capturing preview comprising the first capturing material and the third capturing material.

In some embodiments, the first preview presenting module 830 includes: a first preview switching module configured to switch from the second capturing preview to the first capturing preview in response to detecting that the material identifier corresponding to the second capturing material is selected.

In some embodiments, the material selecting module 820 includes: a gesture detecting module configured to detect a predetermined type of interaction gesture for material switching while a first material identifier in the plurality of material identifiers is selected; and a gesture based material selecting module configured to determine, in response to the predetermined type of interaction gesture indicating switching from the first material identifier to the second material identifier, that the second capturing material corresponding to the second material identifier in the plurality of capturing materials is selected.

In some embodiments, the predetermined type of interaction gesture includes at least one of a sliding gesture and a clicking gesture.

In some embodiments, the apparatus 800 further includes: a first identifier highlighting module configured to highlight, in response to determining that the second capturing material is selected, the material identifier corresponding to the second capturing material.

In some embodiments, the plurality of material identifiers are presented on a capturing startup page to start capturing, and the capturing startup page includes an entry to a capturing material selection interface of the second type. In some embodiments, the apparatus 800 further includes: a first presentation stopping module configured to stop presenting the plurality of material identifiers in response to detecting a triggering indication for the entry to the capturing material selection interface, and an interface presenting module configured to present the capturing material selection interface in response to detecting the trigger indication for the entry to the capturing material selection interface.

In some embodiments, the interface presentation module includes: a second identifier highlighting module configured to highlight, in response to detecting the trigger indication for the entry to the capturing material selection interface while the second capturing material is selected, a material identifier corresponding to the second capturing material in the capturing material selection interface.

In some embodiments, the material presenting module includes a sidebar presenting module configured to present the plurality of material identifiers in a sidebar of the page.

In some embodiments, the apparatus 800 further includes a second presentation stopping module configured to stop presenting the plurality of material identifiers in response to detecting a presentation stopping indication for the plurality of material identifiers.

In some embodiments, the apparatus 800 further includes a third preview switching module configured to switch from the first capturing preview to the third capturing preview in response to detecting a deactivation indication for deactivating a second type of capturing material, the third capturing preview at least including the first capturing material.

In some embodiments, the first type is different from the second type, and the capturing material of the first type or the capturing material of the second type is selected from the following types: background audio, prop, filter, text, sticker, special effect, and capturing template.

In some embodiments, the material presenting module includes: a candidate material determining module configured to determine a set of candidate capturing materials of the second type included in a multimedia content item together with the first capturing material; a material determining module configured to select the plurality of capturing materials from the set of candidate capturing materials based on at least one of the following: popularities of the set of candidate capturing materials, and a user interaction behavior related to the set of candidate capturing materials; and a determined material based presenting module configured to present the plurality of material identifiers corresponding to the determined plurality of capturing materials.

Figure 9:
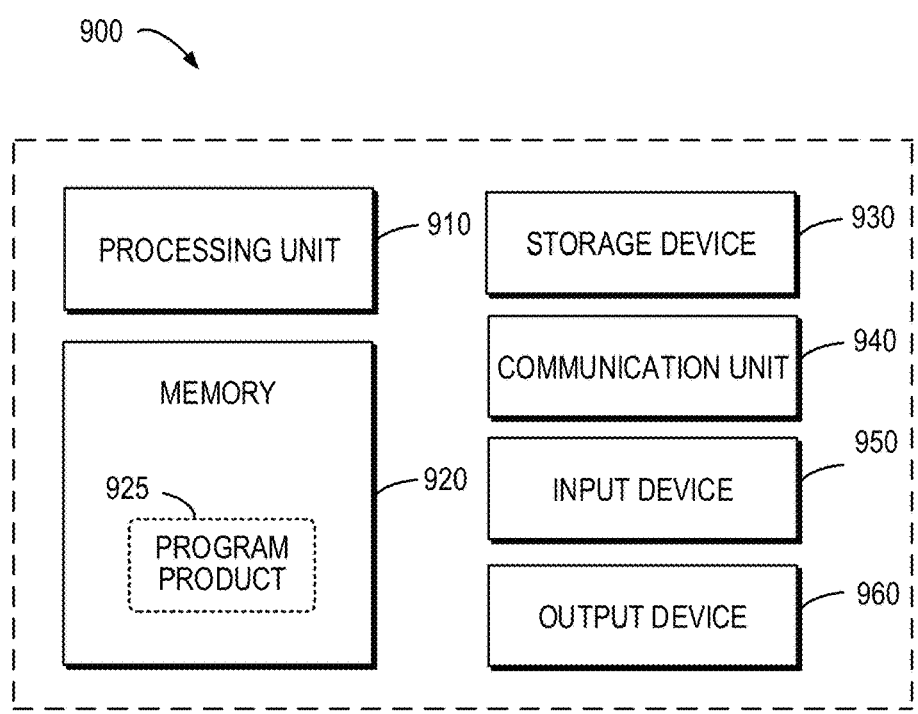
FIG. 9 illustrates an electronic device in which one or more embodiments of the present disclosure may be implemented.

FIG. 9 illustrates a block diagram of an electronic device 900 in which one or more embodiments of the present disclosure may be implemented. It shall be understood that the electronic device 900 shown in FIG. 9 is merely exemplary and should not constitute any limitation on the functionality and scope of the embodiments described herein. The electronic device 900 shown in FIG. 9 may be used to implement the terminal device 110 of FIG. 1.

As shown in FIG. 9, the electronic device 900 is in the form of a general-purpose electronic device. Components of the electronic device 900 may include, but are not limited to, one or more processors or processing units 910, a memory 920, a storage device 930, one or more communications units 940, one or more input devices 950, and one or more output devices 960. The processing unit 910 may be an actual or virtual processor and can perform various processes according to programs stored in the memory 920. In a multiprocessor system, a plurality of processing units executes computer executable instructions in parallel, so as to improve the parallel processing capability of the electronic device 900.

The electronic device 900 typically includes many computer storage media. Such media may be any available media that are accessible by the electronic device 900, including, but not limited to, volatile and non-volatile media, removable and non-removable media. The memory 920 may be a volatile memory (e.g., a register, cache, random access memory (RAM)), non-volatile memory (e.g., read-only memory (ROM), electrically erasable programmable read-only memory (EEPROM), flash memory), or some combination thereof. The storage device 930 may be a removable or non-removable medium and may include a machine-readable medium such as a flash drive, a magnetic disk, or any other medium that can be used to store information and/or data (e.g., training data for training) and that can be accessed within the electronic device 900.

The electronic device 900 may further include additional removable/non-removable, volatile/nonvolatile storage media. Although not shown in FIG. 9, a magnetic disk drive for reading from or writing to a removable, nonvolatile magnetic disk such as a "floppy disk" and an optical disk drive for reading from or writing to a removable, nonvolatile optical disk may be provided. In these cases, each drive may be connected to a bus (not shown) by one or more data media interfaces. The memory 920 may include a computer program product 925 having one or more program modules configured to perform various methods or actions of various embodiments of the present disclosure.

The communication unit 940 implements communication with other electronic devices through a communication medium. In addition, functions of components of the electronic device 900 may be implemented by a single computing cluster or a plurality of computing machines, and these computing machines can communicate through a communication connection. Thus, the electronic device 900 may operate in a networked environment using logical connections to one or more other servers, network personal computers (PCs), or another network node.

The input device 950 may be one or more input devices such as a mouse, keyboard, trackball, etc. The output device 960 may be one or more output devices such as a display, speaker, printer, etc. The electronic device 900 may also communicate with one or more external devices (not shown) such as a storage device, a display device, or the like through the communication unit 940 as required, and communicate with one or more devices that enable a user to interact with the electronic device 900, or communicate with any device (e.g., a network card, a modem, or the like) that enables the electronic device 900 to communicate with one or more other electronic devices. Such communication may be performed via an input/output (I/O) interface (not shown).

According to an exemplary implementation of the present disclosure, a computer readable storage medium is provided, on which a computer-executable instruction is stored, wherein the computer executable instruction is executed by a processor to implement the above-described method. According to an exemplary implementation of the present disclosure, there is also provided a computer program product, which is tangibly stored on a non-transitory computer readable medium and includes computer-executable instructions that are executed by a processor to implement the method described above.

Aspects of the present disclosure are described herein with reference to flowchart and/or block diagrams of methods, apparatus, devices and computer program products implemented in accordance with the present disclosure. It will be understood that each block of the flowcharts and/or block diagrams and combinations of blocks in the flowchart and/or block diagrams can be implemented by computer readable program instructions.

These computer readable program instructions may be provided to a processing unit of a general-purpose computer, special purpose computer, or other programmable data processing apparatus to produce a machine, such that the instructions, which execute via the processing unit of the computer or other programmable data processing apparatus, create means for implementing the functions/actions specified in one or more blocks of the flowchart and/or block diagrams. These computer readable program instructions may also be stored in a computer readable storage medium that can direct a computer, a programmable data processing apparatus, and/or other devices to function in a particular manner, such that the computer readable medium storing the instructions includes an article of manufacture including instructions which implement various aspects of the functions/actions specified in one or more blocks of the flowchart and/or block diagrams.

The computer readable program instructions may be loaded onto a computer, other programmable data processing apparatus, or other devices, causing a series of operational steps to be performed on a computer, other programmable data processing apparatus, or other devices, to produce a computer implemented process such that the instructions, when being executed on the computer, other programmable data processing apparatus, or other devices, implement the functions/actions specified in one or more blocks of the flowchart and/or block diagrams.

The flowcharts and block diagrams in the drawings illustrate the architecture, functionality, and operations of possible implementations of the systems, methods and computer program products according to various implementations of the present disclosure. In this regard, each block in the flowchart or block diagram may represent a module, segment, or portion of instructions which includes one or more executable instructions for implementing the specified logical function(s). In some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

Various implementations of the disclosure have been described as above, the foregoing description is exemplary, not exhaustive, and the present application is not limited to the implementations as disclosed. Many modifications and variations will be apparent to those of ordinary skill in the art without departing from the scope and spirit of the implementations as described. The selection of terms used herein is intended to best explain the principles of the implementations, the practical application, or improvements to technologies in the marketplace, or to enable those skilled in the art to understand the implementations disclosed herein.

We claim:

1. A method for content capturing using a camera, comprising:
    selecting a first capturing material of at least a first type from a material library for content capturing;
    in response to determining that the first capturing material of at least the first type is selected, presenting a plurality of material identifiers corresponding to and identifying a plurality of capturing materials of at least a second type, the plurality of capturing materials of at least the second type being associated with the first capturing material of at least the first type;
    determining a second capturing material from the plurality of capturing materials based on selection of a material identifier in the plurality of material identifiers; and
    in response to determining that the second capturing material is selected, presenting a first capturing preview, the first capturing preview comprising the first capturing material and the second capturing material.

2. The method of claim 1, further comprising:
    in response to detecting a request for capturing with a same type of a multimedia content item of interest, determining that the first capturing material included in the multimedia content item of interest is selected.

3. The method of claim 2, wherein in response to the multimedia content item of interest comprising a third capturing material of the second type, the plurality of capturing materials at least comprises the third capturing material.

4. The method of claim 3, further comprising:
    in response to the first capturing material being selected, determining that the third capturing material is selected by default; and
    presenting a second capturing preview comprising the first capturing material and the third capturing material.

5. The method of claim 4, wherein presenting the first capturing preview comprises:
    in response to detecting that a material identifier corresponding to the second capturing material is selected, switching from the second capturing preview to the first capturing preview.

6. The method of claim 1, wherein determining the second capturing material from the plurality of capturing materials comprises:
    detecting a predetermined type of interaction gesture for material switching while a first material identifier in the plurality of material identifiers is selected; and
    in response to the predetermined type of interaction gesture indicating switching from the first material identifier to the second material identifier, determining that the second capturing material corresponding to the second material identifier in the plurality of capturing materials is selected.

7. The method of claim 1, further comprising:
    in response to determining that the second capturing material is selected, highlighting the material identifier corresponding to the second capturing material.

8. The method of claim 1, wherein the plurality of material identifiers are presented on a capturing startup page to start capturing, the capturing startup page comprises an entry to a capturing material selection interface of the second type, and the method further comprises:
    in response to detecting a triggering indication for the entry to the capturing material selection interface:
    stopping presenting the plurality of material identifiers, and
    presenting the capturing material selection interface.

9. The method of claim 8, wherein presenting the capturing material selection interface comprises:
    in response to detecting the triggering indication for the entry to the capturing material selection interface while the second capturing material is selected, highlighting a material identifier corresponding to the second capturing material in the capturing material selection interface.

10. The method of claim 1, wherein presenting the plurality of material identifiers comprises:
    presenting the plurality of material identifiers in a sidebar of a page presenting the plurality of material identifiers corresponding to and identifying the plurality of capturing materials of at least the second type.

11. The method of claim 1, further comprising:
    in response to detecting a presentation stopping indication for the plurality of material identifiers, stopping presenting the plurality of material identifiers.

12. The method of claim 1, further comprising:
    in response to detecting a deactivation indication for deactivating the second capturing material of the second type, switching from the first capturing preview to a third capturing preview, the third capturing preview at least comprising the first capturing material of the first type.

13. The method of claim 1, wherein presenting the plurality of material identifiers comprises:
    determining a set of candidate capturing materials of the second type included in a multimedia content item together with the first capturing material;
    selecting the plurality of capturing materials from the set of candidate capturing materials based on at least one of the following:
    a number of times that a candidate capturing material in the set of candidate capturing materials is used, a user interaction behavior related to the set of candidate capturing materials, the user interaction behavior at least comprising a collecting behavior, a liking behavior a sharing behavior, or a commenting behavior; or presenting the plurality of material identifiers corresponding to the determined plurality of capturing materials.

14. An electronic device including a camera, comprising:
at least one processing unit; and
at least one memory coupled to the at least one processing unit and storing instructions for execution by the at least one processing unit, the instructions, when executed by the at least one processing unit, causing the device to perform acts comprising:
selecting a first capturing material of at least a first type from a material library for content capturing;
in response to determining that the first capturing material of at least the first type is selected, presenting a plurality of material identifiers corresponding to and identifying a plurality of capturing materials of at least a second type, the plurality of capturing materials of at least the second type being associated with the first capturing material of at least the first type;
determining a second capturing material from the plurality of capturing materials based on selection of a material identifier in the plurality of material identifiers; and
in response to determining that the second capturing material is selected, presenting a first capturing preview, the first capturing preview comprising the first capturing material and the second capturing material.

15. The device of claim 14, wherein the acts further comprise:
in response to detecting a request for capturing with a same type of a multimedia content item of interest, determining that the first capturing material included in the multimedia content item of interest is selected,
wherein in response to the multimedia content item of interest comprising a third capturing material of the second type, the plurality of capturing materials at least comprises the third capturing material.

16. The device of claim 15, wherein the acts further comprise:
in response to the first capturing material being selected, determining that the third capturing material is selected by default; and
presenting a second capturing preview comprising the first capturing material and the third capturing material.

17. The device of claim 14, wherein determining the second capturing material from the plurality of capturing materials comprises:
detecting a predetermined type of interaction gesture for material switching while a first material identifier in the plurality of material identifiers is selected; and
in response to the predetermined type of interaction gesture indicating switching from the first material identifier to a second material identifier, determining that the second capturing material corresponding to the second material identifier in the plurality of capturing materials is selected.

18. The device of claim 14, wherein the acts further comprise:
in response to determining that the second capturing material is selected, highlighting the material identifier corresponding to the second capturing material.

19. The device of claim 14, wherein the plurality of material identifiers are presented on a capturing startup page to start capturing, the capturing startup page comprises an entry to a capturing material selection interface of the second type, and the method further comprises:
in response to detecting a triggering indication for the entry to the capturing material selection interface:
stopping presenting the plurality of material identifiers, and
presenting the capturing material selection interface.

20. A non-transitory computer readable storage medium having a computer program stored thereon which, when executed by a processor, causes a device including a camera to perform acts comprising:
selecting a first capturing material of at least a first type from a material library for content capturing;
in response to determining that the first capturing material of at least the first type is selected, presenting a plurality of material identifiers corresponding to and identifying a plurality of capturing materials of at least a second type, the plurality of capturing materials of at least the second type being associated with the first capturing material of at least the first type;
determining a second capturing material in from the plurality of capturing materials based on selection of a material identifier in the plurality of material identifiers; and
in response to determining that the second capturing material is selected, presenting a first capturing preview, the first capturing preview comprising the first capturing material and the second capturing material.

* * * * *